Patented Nov. 1, 1927.

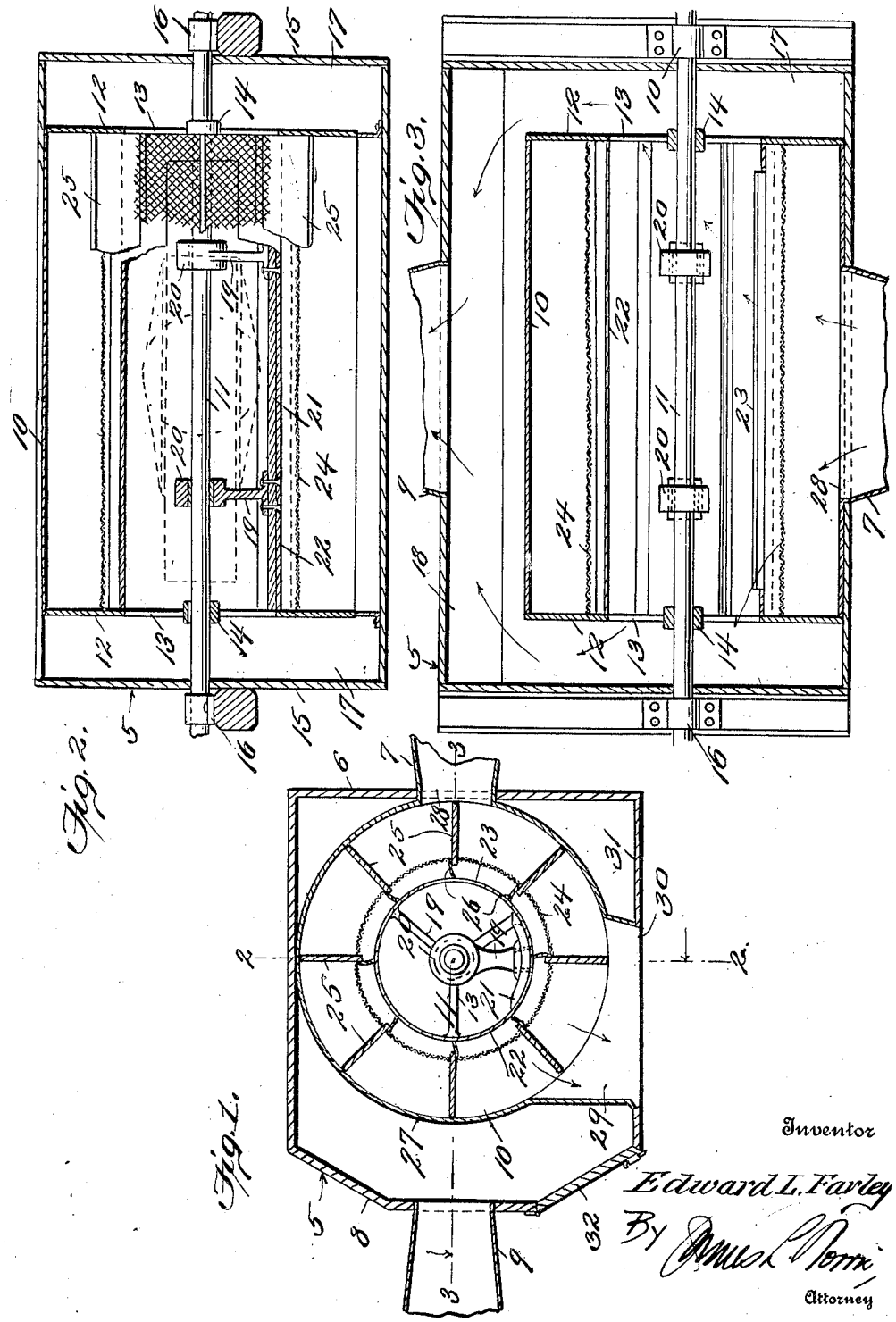

1,647,860

UNITED STATES PATENT OFFICE.

EDWARD L. FARLEY, OF JONESBORO, ARKANSAS.

COTTON FEEDER AND SEPARATOR.

Application filed September 7, 1926. Serial No. 133,915.

This invention relates to a cotton feeder and separator, and the primary object of the invention is to provide a cotton treating device of the class specified wherein a vacuum is established at the core of means traversed by the cotton during transfer movement thereof from the inlet of the feeder and separator around the core to a point of discharge by excluding air from the cotton, and whereby the cotton exits from the feeder and separator in a close mass for advantageous operation thereon by further cotton treating instrumentalities.

Another object of the invention is to provide a cotton feeder and separator having a novel arrangement of parts to relieve the cotton of air and suction effect as soon as it enters the improved device, to better induce the formation of a vacuum at the center or core of means traversed by the cotton during movement thereof towards a point of discharge.

Another object of the invention is to generally improve cotton feeders and separators by comparatively simplifying their structures and reducing wear of the parts thereof to a minimum.

With the foregoing and other objects and advantages in view, the invention consists in the preferred construction and arrangement of the several parts which will be more fully hereinafter described and claimed.

In the drawing:

Fig. 1 is a transverse vertical section taken through the center of a feeder and separator embodying the features of the invention.

Fig. 2 is a longitudinal vertical section on the line 2—2, Fig. 1, and showing parts broken away.

Fig. 3 is a horizontal section on the line 3—3, Fig. 1.

The feeder and separator comprises an outer casing generally designated by the reference character 5 and formed of suitable material. The casing 5 has at one side 6 an air inlet tube 7 and at the opposite side 8 an outlet tube 9, which is adapted to communicate with a suitable suction-creating apparatus such as a fan or other device commonly used in cotton-treating apparatus. The tube 7 will extend to and have communication with a source of cotton storage, from which the cotton is drawn by the suction created through the feeder and separator, as will be readily understood. Within the casing 5 a drum 10 is mounted on a shaft 11, the opposite ends 12 of the drum 10 being provided with central spiders 13 of an open character. The spiders 13 have central eyes 14 through which the shaft 11 extends and continues outwardly through the opposite ends 15 of the casing 5 and also through bearing devices 16, suitable power devices being associated with the said shaft to regularly rotate the same. The drum 10 is of less length than the casing 5, and between the opposite ends 12 of the drum and the ends 15 of the casing, air chambers 17 are formed and have full open communication with a rear discharge chamber 18 with which the outlet tube 9 has communication. On the shaft 11 are loose hangers 19, the shaft revolving within these hangers, which are held in fixed position relatively to the shaft by set collars 20. The hangers 19 are secured at their lower extremities to a weight 21, which extends the full length of the bottom of a cylinder 22 and is preferably of the form shown by Fig. 1 and is held in fixed position at the bottom of the cylinder or pipe 22, which has an opening 23 in line with the end of the inlet pipe 7 extending into the side 6 of the casing 5. The cylinder or pipe 22 always remains in fixed position so that the opening 23 will receive the suction air currents therethrough, said currents passing outwardly through the opposite open ends of the cylinder into the chambers 17 and thence into the discharge chamber 18 and out through the discharge pipe or outlet 9. Around the cylinder 22 and spaced a suitable distance therefrom is a wire screen enclosure 24 fixed to the inner ends of rotating wings or paddles 25 which extend the full length of the drum between the ends 12, the inner ends of the wings or paddles extending through the wire gauze enclosure 24 and have fixed thereto rubber strips or yielding valve devices 26, which have their free ends closely bearing against and rotatable in connection with the cylinder or tube 22. The drum 10 rotates within a supplemental casing 27, of suitable material, fixed within the outer casing 5 and provided with an opening 28 to which the inner end of the inlet pipe 7 is secured, the lower portion of the supplemental casing 27 having a downwardly opening outlet 29, which extends to an opening 30 in the bottom 31 of the outer casing 5. The drum 10 comprising the wings 25, rubber valve strips 26 and enclosing screen 24, rotates around the cylinder or pipe 22, but the cotton obviously does not come into contact with the said cylinder or pipe, owing to the wire gauze enclosure 24. In the lower portion of the wall 8 of the casing 5 below the outlet or discharge pipe 9 a door 32 is mounted to give access to the interior of the casing 5 for cleaning purposes. This door 32 will be normally closed and held in fixed closed position.

The cotton, whether of a clean or trashy or bolly nature, is drawn through the inlet 7 from the source of supply or storage by the suction exerted through the outlet tube 9 and the foregoing parts of the feeder and separator into the casing 27 and is immediately taken up by the rotating wings or paddles 25 and carried around against the wire screen enclosure or cylinder 24, the air passing through the opening 23 of the said pipe or cylinder into the chambers 17 and from the latter into the discharge chamber 18 and then through the outlet pipe 9. The cotton carried around by the wings or paddles 25, which terminate in close position relatively to the inner part of the supplemental casing 27, is regularly moved free of air by the said wings or paddles and between the heads 12, and thereby the cotton is held in a restricted area and is discharged into the downwardly opening outlet 29 and passes out through the opening 30, for instance, into a cleaner or other mechanism for further treatment. The rubber strips or yielding valve devices 26 which form the inner tips of the wings or paddles 25 closely engage the outer surface of the air outlet pipe or cylinder 22 and operate to complete the vacuum and with the said wings or paddles produce a vacuum at the core of the drum, which is materially advantageous in contributing to more even feed from place of storage and centralizing the mass of cotton being treated by obviating an outward throw and indiscriminate passage of the cotton through the feeder and separator. This core vacuum production is due, also, to the air passing out through the cylinder or pipe 22 and thereby liberated from the cotton, and when the wings or paddles 25 revolve around the pipe or cylinder 22, the rubber strips or valves 26 always bear upon a smooth surface, and owing to the interposition of the screen cylinder 24, the said rubber strips or valves do not come into contact with the cotton.

From the foregoing it will be perceived that the most essential feature of the present invention is the formation of the vacuum at the core of the drum, which is due to the air inlet control within the mechanism together with the manner of liberating the air coming into the feeder and separator with the cotton through the inlet opening or tube 7 and passing into the opening 23 of the cylinder or pipe 22, the air thus being almost instantly separated from the cotton delivered into the feeder and separator, and the cotton treated or carried around and in engagement with the screen enclosure 24 is confined in the pockets provided by the wings or paddles 25, the said screen enclosure 24 and the supplemental casing 27. The vacuum at the core of the machine is maintained by the close relation of the inner free ends of the rubber valve strips 26 relatively to the outer surface of the cylinder or pipe 22, and as the ends of these rubber valve strips engage the outer smooth surface of the cylinder 22, wear thereon is negligible and the vacuum will be positively maintained for a comparatively long period of service.

The present improved feeder and separator is distinguished from prior structures that employ a stationary screen instead of a rotary screen, as in the present instance, and rely upon the distributor belt to form the vacuum. Other prior structures employ a stationary screen with a revolving vacuum means beneath with rubber tips at the outer edge or circumference thereof to form the vacuum, while other structures comprise a revolving drum taking the air through the screen and attaching an outlet pipe at one side and depending on rubber strips at the outer edges of the wings or paddles on the drum to complete the vacuum, and in other types of machines a revolving screen is used with a vacuum beneath. Where the vacuum is formed by the distributor belt, replacements are necessarily frequent, and in that type of machine where the vacuum is formed by rubber tips, the method pursued is dependable as long as the tips are responsive, but eventually the tips turn back and become set and have to be renewed. All of the disadvantages incident to these prior mechanisms are fully overcome by the present improved structure, wherein the rubber valve strips engage a smooth pipe or cylinder surface and continually remain out of contact with the cotton, which is held outside of the revolving screen or exterior of the location of the rubber strips secured to the inner extremities of the wings or paddles 25.

It is proposed to apply the improved feeder and separator to any form of cleaner or other apparatus for treating cotton, and such changes in the proportions and dimensions as well as the minor details of construction may be adopted as found necessary to accommodate various applications.

What is claimed as new is:—

1. A cotton feeder and separator comprising an outer enclosing casing with a supplemental casing fixed therein, an inlet and an outlet communicating with opposite sides of the outer casing for respectively supplying cotton to the device and discharging air and dust therefrom, a central fixed tube in the supplemental casing with an opening in the side portion in line and communicating with said inlet, the tube being shorter than the outer casing and open at the opposite ends and having communication with the said outlet through the inner end portions and back of the outer casing, a drum rotatable around the tube and comprising a screen tube spaced from the said central fixed tube and having radial paddles extending out to the inner surface of the supplemental fixed casing, rubber valve tips secured to the inner edges of the paddles and located between the screen tube and the central fixed tube, the paddles having their inner ends continually in contact with and sweeping the outer surface of the central fixed tube whereby a vacuum is formed at the core of the drum adjacent to the said inner tube, and a rotatable shaft with which the said screen tube is associated.

2. A feeder and separator comprising an outer enclosing casing and an inner fixed supplemental casing of less length than the outer casing, a rotatable screen tube within the inner supplemental casing and extending fully to the ends of the latter casing and having radial paddles extending outwardly to the inner wall of an inner supplemental casing, rubber valve tips secured to the inner edges of the paddles, an inner discharge tube spaced from the said screen and having an air inlet opening, the ends of the said discharge tube being open and communicating with the interior of the outer casing, the rubber valve tips extending across the space between the screen tube and the inner air discharge tube, a rotatable shaft extending through the center of the inner discharge tube and with which the screen tube and paddles are associated uniformly to rotate therewith, and an inlet disposed opposite the opening of the inner discharge tube and extending away from the outer casing at a point opposite to the said inlet.

3. A feeder and separator comprising an outer casing with a side inlet and an opposite side outlet and provided with a supplemental casing fixed therein and of less length than the said outer casing and provided with a bottom discharge separated from the interior of said outer casing, a rotary cotton conveying screen means located within and extending the full length of the supplemental casing and having a fixed air liberating tube in the center thereof, the said latter tube having a side opening in line with the inlet through the outer enclosing casing, a rotatable shaft extending through the said central tube and with which the conveying screen means is operatively associated and paddles carried by the said conveying screen means and movable therewith and having yielding valve means at their inner edges which contact with the outer surface of the said central tube.

4. A feeder and separator having an outer casing with an inlet and outlet at opposite side portions thereof, a central fixed air tube open at its opposite ends and communicating with the end portion of the outer casing and also having an opening therein opposite to said inlet, a rotary shaft extending through the said air tube and a rotary screen cotton conveying means movable around the said tube and divided into compartments by paddles which are movable therewith and divided compartments with relation to the tube with screen bottom portion and also provided with yielding devices between the tube and screen bottom portions provided by the rotary screen cotton conveying means and maintaining with the tube a core suction and whereby also the cotton is conveyed from the inlet of the discharge outlet free of the influence of air, the casing and the rotary screen cotton conveying means having a bottom outlet separated from the interior of the casing which facilitates the discharge of the cotton by gravitation, to the bottom outlet through the enclosing casing and from the rotary cotton conveying means being at all times separate from the inlet to said casing and to the central core.

5. A feeder and separator having an outer enclosing casing with an inlet and an outlet in opposite side portions and also provided with a bottom discharge opening which is closed off from the remaining structure of the outer casing, an inner supplemental casing fixed in the outer casing, and of less length than the latter casing to form air passages at the ends and also of less diameter than said casing to form an outlet air passage at the rear of the outlet casing, said lower discharge opening extending from the lower portion of the said supplemental casing, a central fixed air tube of the same length as and mounted in the supplemental casing and opening at the end and communicating with the interior of the outer enclosing casing and also having an opening in the side portion thereof opposite the inlet of the outer enclosing casing, a rotary shaft extending through the said air tube and having a lower weight suspended therefrom extending the full length of the said central fixed air tube and secured to the bottom portion of the latter, and a rotary screen cotton conveying means movably associated with the said shaft and mounted around the tube and having compartments formed therein by paddles fixed thereto which are provided with yielding devices between the tube and the said rotary screen conveying means to form and maintain within the tube a core suction and also to have the cotton conveyed from the inlet to the discharge outlet free of the influence of air.

In testimony whereof I have hereunto set my hand.

EDWARD L. FARLEY.